No. 664,880. Patented Jan. 1, 1901.
C. W. MILES.
EVAPORATING APPARATUS.
(Application filed Dec. 18, 1899.)
(No Model.) 4 Sheets—Sheet 2.
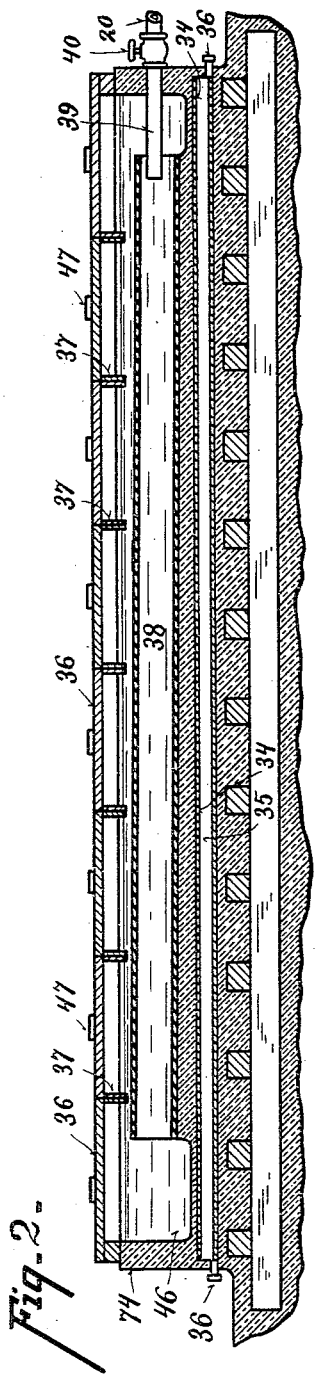
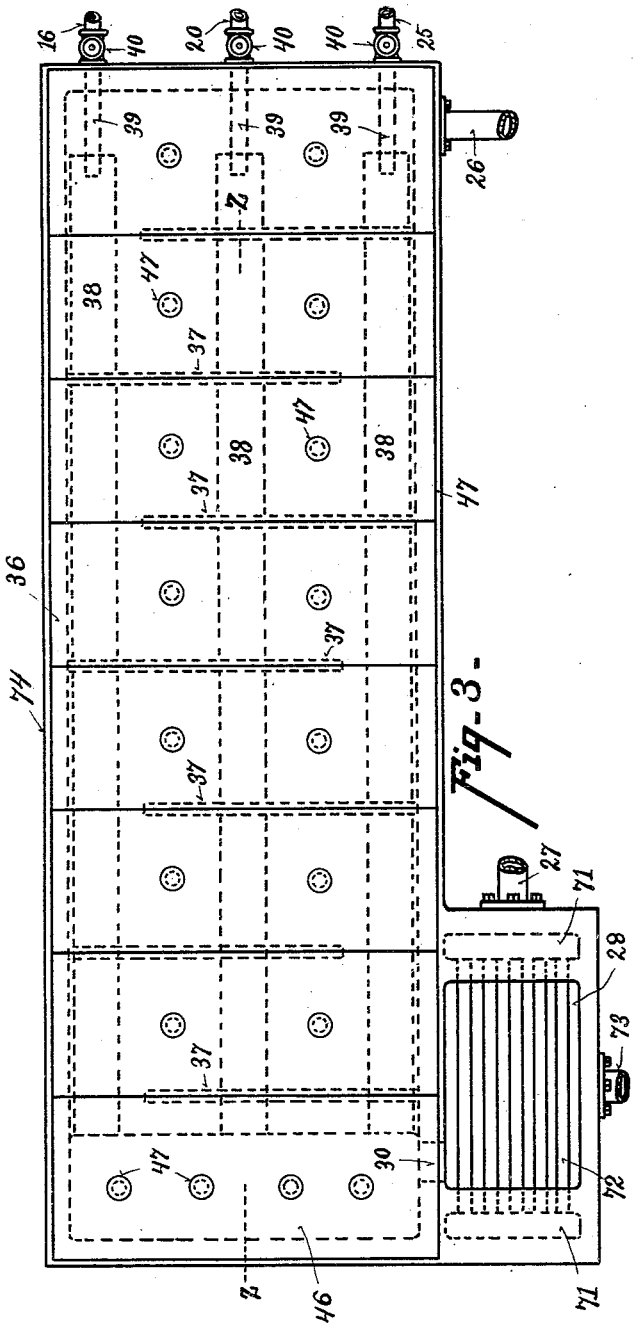
Witnesses
Oliver B. Kaiser
W. R. Wood
Inventor
Casper W. Miles No. 664,880. Patented Jan. 1, 1901.
C. W. MILES.
EVAPORATING APPARATUS.
(Application filed Dec. 18, 1899.)
(No Model.) 4 Sheets—Sheet 3.
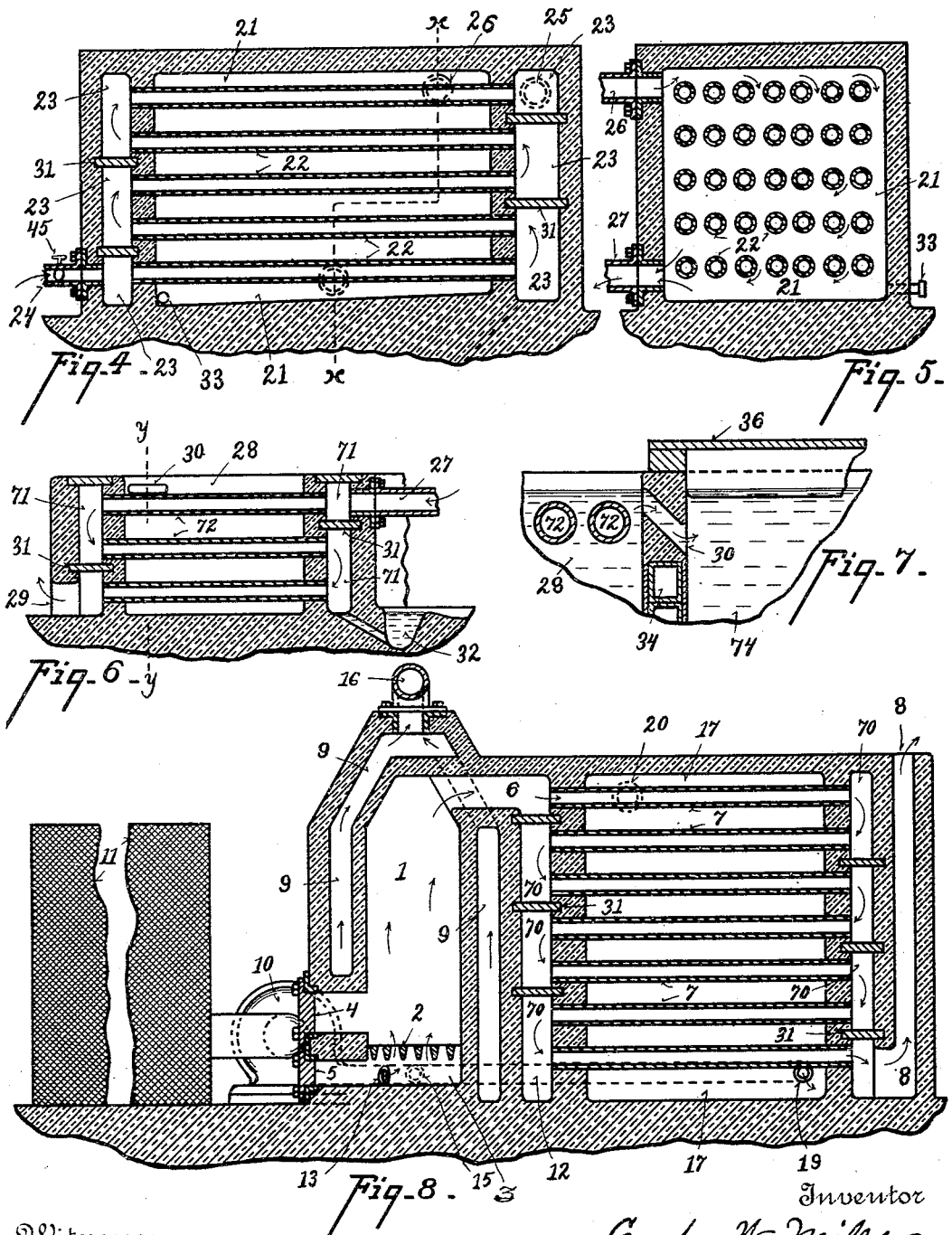

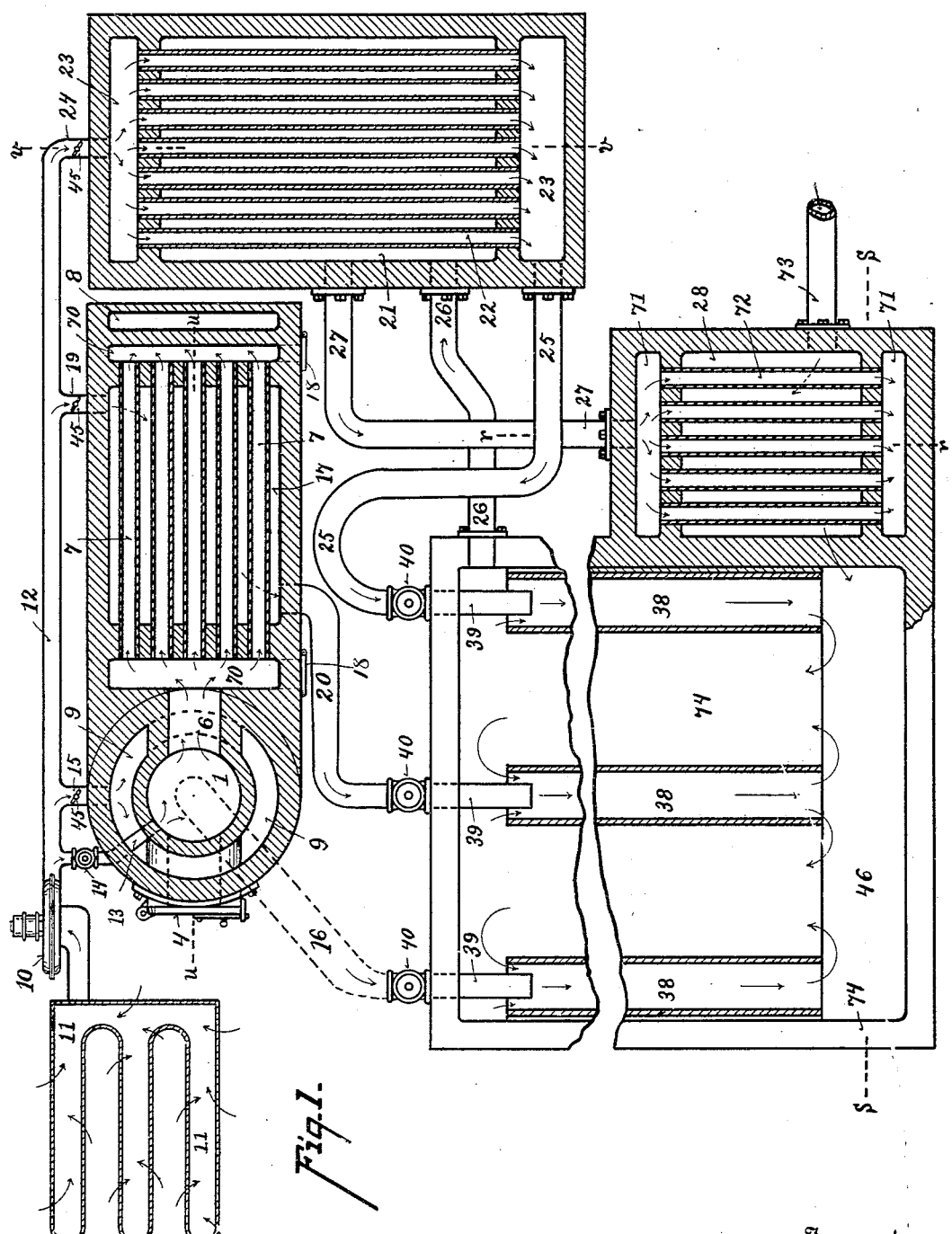

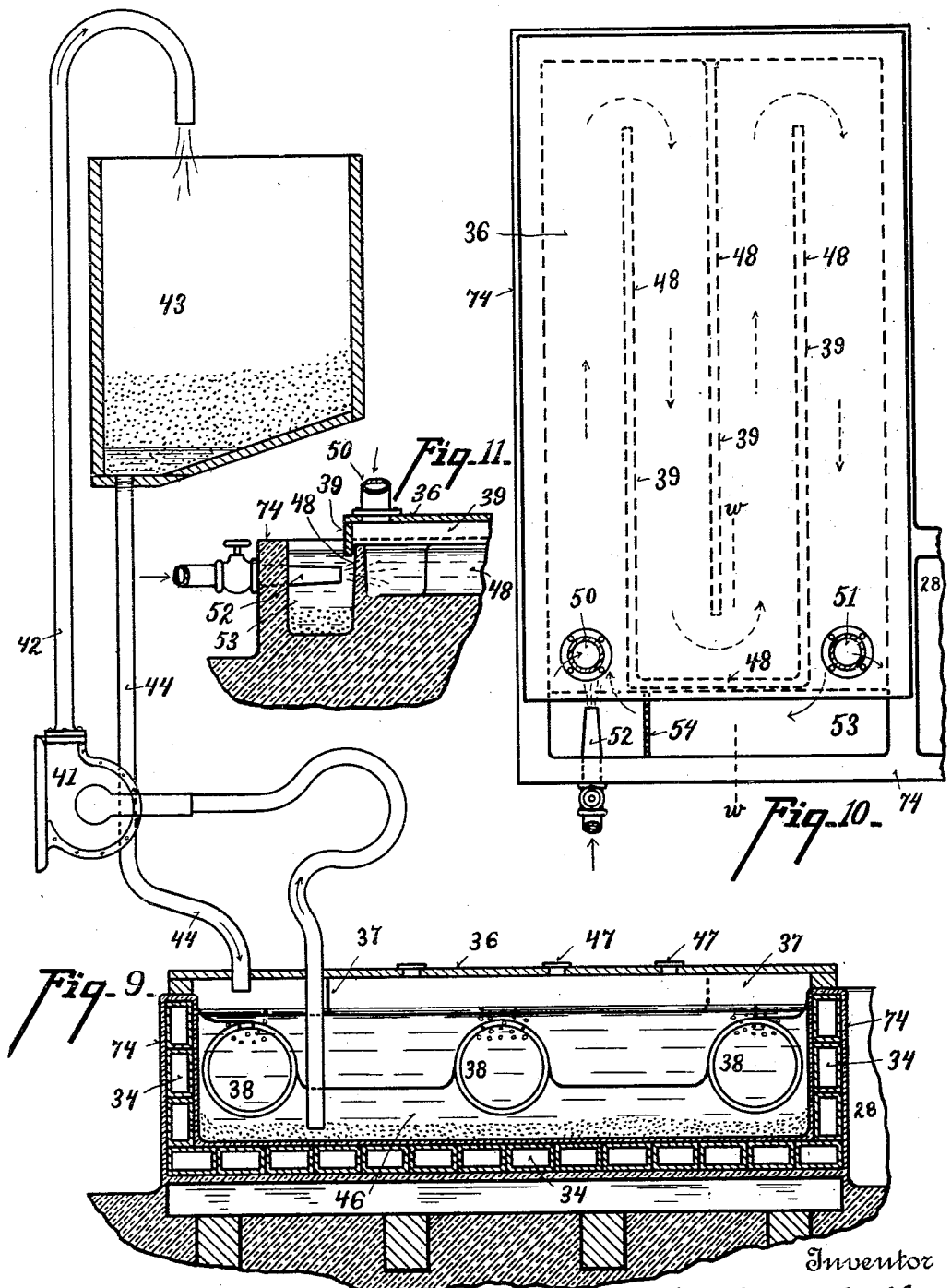

UNITED STATES PATENT OFFICE.

CASPER W. MILES, OF CINCINNATI, OHIO.

EVAPORATING APPARATUS.

SPECIFICATION forming part of Letters Patent No. 664,880, dated January 1, 1901.

Application filed December 18, 1899. Serial No. 740,730. (No model.)

*To all whom it may concern:*

Be it known that I, CASPER W. MILES, a citizen of the United States, residing at Cincinnati, in the county of Hamilton and State of Ohio, have invented certain new and useful Improvements in Evaporating and Crystallizing Apparatus; and I hereby declare the following to be a full, clear, and exact description of the invention, such as will enable others skilled in the art to which it appertains to make and use the same.

My invention relates to improvements in apparatus for evaporating and crystallizing salt and other substances from solution. One of its objects is to provide apparatus which will resist the corrosive action of the substance to be evaporated, and can therefore be run continuously for long periods.

Another object is to provide an apparatus which will not be quickly rendered inoperative by the accumulation of scale thereon.

Another object is to provide an apparatus adapted to be operated more economically in regard to fuel than heretofore.

Another object is to provide an apparatus adapted to be operated at a less expenditure of labor than heretofore.

Another object is to provide an apparatus in which a greater amount of evaporation can be carried on in a pan of a given size.

Another object is to obviate the necessity of employing an exhaust or vacuum pump where it is desired to evaporate at low temperatures.

My invention further consists in certain details of construction and combination, all of which will be fully described in connection with the accompanying drawings, in which—

Figure 1 represents a diagram in top plan of my improved apparatus, partly in section. Fig. 2 is a central vertical section through the evaporating-pan on line $z\ z$, Fig. 3. Fig. 3 is a top plan view of the evaporating-pan with its cover on. Fig. 4 is a vertical section on line $v\ v$, Fig. 1. Fig. 5 is a vertical section on line $x\ x$, Fig. 4. Fig. 6 is a vertical section on line $r\ r$, Fig. 1. Fig. 7 is a section on line $y\ y$, Fig. 6. Fig. 8 is a vertical section through the furnace on line $u\ u$ of Fig. 1. Fig. 9 is an enlarged cross-section through the evaporating-pan on line $s\ s$, Fig. 1, and showing the manner of removing the crystals from the pan. Fig. 10 is a top plan view showing a modification of the evaporating-pan. Fig. 11 is a section on line $w\ w$, Fig. 10.

Referring to Figs. 1 and 8, 1 represents the combustion-chamber; 2, the grate; 3, the ash-pit; 4, the fuel-feeding door, and 5 the ash-pit door. At the top the combustion-chamber terminates in a flue 6, from which the products of combustion circulate successively through the several tiers of flue-pipes 7, and finally escape through the offtake-flue 8. This combustion-chamber is preferably composed of brickwork and is surrounded by a jacket-space 9, preferably built into the brickwork.

10 represents a blower which takes air from a screening or filtering chamber 11 and supplies it through pipe 12 to the various parts of the apparatus.

13 represents a branch pipe having a valve 14, which supplies air to the ash-pit to support combustion and furnish the draft, which is regulated by the valve 14. Branch pipe 15 supplies air to the jacket-space 9, where it takes up the heat radiated and conducted from the combustion-chamber, and thence passes through pipe 16 at the top of the jacket to the evaporating-pan, where it is brought in contact with the substance or solution to be evaporated, and absorbs moisture therefrom. The pipes 7 span a chamber 17, preferably built up of brickwork with the connecting-flues 70 between the several tiers built in the walls thereof.

18 represents doors giving access to clean the flues and pipes 7.

19 represents a branch pipe from pipe 12 supplying air to the chamber 17. After being heated by contact with the pipes 7 the air from chamber 17 is carried through pipe 20 to the evaporating-pan and brought in contact with the solution. A chamber 21 is also provided, preferably built up of brickwork, with a series of pipes 22 and connecting-flues 23, built in the walls at opposite ends. Through these pipes 22 is circulated another volume of air supplied through branch pipe 24 and conducted to the evaporating-pan through pipe 25. The air circulating through pipes 22 is heated by the spent or vapor-laden air which escapes or issues from the evaporating-pan through pipe 26. From the chamber 21 the vapor-laden air is conducted through pipe 27 to the tank or pan 28, where it is brought in contact with and heats the solution previous to its introduction into the main pan, the vapor-laden air finally escaping through the exit 29. As shown in Figs. 6 and 7 the solution after being heated passes through the diagonal passage 30, so as to prevent the escape of any air from the main pan in this direction.

The flues 70 71 23 may be subdivided, as desired, by a greater or less number of partitions 31, so as to cause the circulating gases to pass in either multiple or parallel series, as desired. The pipes are preferably laid in cement in the brickwork, thus avoiding all pipe-fittings. The tubes 72 are preferably of glass, porcelain, or similar substance, so as not to be corroded by or to discolor or contaminate the solution.

32 represents a trap through which the water condensed from the vapor-laden air in the tubes is voided.

33 represents a capped pipe or nipple through which the water of condensation from the chamber 21 may be drawn off.

The evaporating-pan 74 may be built up of brickwork laid in cement, but is preferably formed of one or more layers of hollow tile 34 laid in cement, preferably upon a timber and concrete foundation, as shown in Figs. 2 and 9, the hollow tiles serving to form a non-conduction air-jacket at the sides and bottom of the pan, which is very important in cool weather in protecting the pan from loss of heat in this direction. These tiles are preferably laid end to end, so as to form continuous tubular air-spaces, as indicated at 35, Fig. 2.

36' represents capped nipples set in the cement-work, by means of which any leak may be detected, localized, and repaired and the solution drawn off from the tile-jacket after the leak has been repaired.

Across the top of the pan is secured a deck or cover 36, preferably composed or built up of short sections placed side by side and clamped together, if desired, to form a continuous structure. To the under side of this cover are secured baffle-plates 37, having their lower edges dipping a short distance below the surface of the solution.

In Figs. 1, 2, 3, and 9 I have shown large tubes 38, submerged in the solution and open at both ends. Projecting slightly into one end of each of these tubes is the escape-nozzle 39 of one of the pipes 16 20 25, conveying heated air to the pan. 40 represents controlling-valves. The tubes 38 are preferably of vitreous material, such as porcelain or glazed earthenware, laid in cement with their top edges slightly submerged in the solution and slightly inclined, so as to be higher at the outlet end. All of the pipes 16 20 25 may, if desired, discharge into one tube 38.

A centrifugal pump 41 is employed to lift the crystals and a portion of the solution through pipe 42 to the draining-tank 43, from whence the solution draining off is returned to the pan through pipe 44. The pipes 42 44 are preferably provided with an insulated covering. (Not shown.)

The mode of operation is as follows: The pan is filled with solution, a fire is started in the combustion-chamber, and the blower 10 started, which draws a supply of air through the screen 11, freeing it from all dust and dirt. Valve 14 is regulated so as to supply the requisite quantity of air for a slow and complete combustion of the fuel. The relative supply of air through the branch pipes 15, 19, and 24 is regulated by means of butterfly-valves 45, located, respectively, in the several branch pipes. The heated air issuing from the jacket 9, the chamber 17, and the chamber 21 is conducted through the nozzles 39 to one or more of the tubes 38, where it is allowed to escape in the form of air-bubbles and traverse the tube and rise to the surface of the solution at the other end of the tubes, the object of these tubes being to bring and hold the heated air and solution in intimate contact for a sufficient length of time to heat the solution and permit the air to become saturated with vapor. The air escaping from the tubes 38 rises under the cover 36 at one end of the pan, from whence it is caused by the baffle-plates 37 to travel a circuitous route in intimate contact with the surface of the solution, which insures the complete saturation of the air with vapor. As the hot vapor-laden air escapes through pipe 26 from beneath the cover 36 it is conducted to the chamber 21, where it gives up to the fresh air circulating through the pipes therein not only its sensible heat, but also the bulk of latent heat of the vapor resulting from the condensation of the vapor. Any heat, perceptible or latent, above the temperature of the incoming solution is finally absorbed in the heater or supplemental pan 28.

Where the tubes 38 are employed in the pan, the solution is circulated by the injection of heated air into the tubes, which causes the bulk of the crystals to settle in the offset or deeper portion of the pan 46. The lower section of pipe 42 is preferably flexible, and may be introduced into any one of the openings 47 through the cover to withdraw the crystals, which are conveyed to one or more draining-tanks 43.

It is often desirable to carry on a slow process of crystallization in order to secure large crystals or to prevent overheating of the solution. In order to accomplish this, I dispense with the tubes 38 and preferably provide partitions 48, (see Figs. 10 and 11,) rising from the bottom of the pan to a point slightly above the top of the solution, the baffle-plates 39 being in this modification located directly above and meeting the top of the partitions. The bulk of the heated air enters the space beneath the cover through pipe 50, travels along above and in contact with the surface of the solution, as indicated by the arrows, Fig. 10, and makes its exit through pipe 51. A regulated quantity of air may be injected through the nozzle 52 to cause the solution to also circulate in the direction of the arrows with more or less speed, as desired. The crystals are carried by the current in the solution to the space 53, where they may be intercepted by the screen 54 or allowed to settle to the bottom. This space is not covered, so that the crystals may be removed by the method shown or by the methods heretofore employed.

By employing the above I am enabled to produce a very simple, effective, and economical evaporating apparatus. By employing a pan built up with cement in the manner specified the solution is not discolored or contaminated by the corrosion of metal as in the tanks heretofore employed. By applying the heat in the manner specified there is a direct, quick, and perfect interchange of heat, which could not be effected through the walls of metal pipes. There is no scale formed to obstruct the interchange of heat or to necessitate the frequent closing down of the apparatus to remove the accumulated scale, as has been necessary heretofore, and I am enabled to operate my apparatus continuously for long periods. The solution may be allowed to stand cold in the pan without injury to either pan or solution, or it may be withdrawn and the pan and apparatus allowed to stand idle without injury.

73 represents a pipe supplying fresh solution to the pan.

Where it is important that the solution is not overheated, the amount of air admitted to the jackets of the flue and combustion-chamber is regulated, so that the temperature of the air going to the pan does not rise above the desired temperature.

Having described my invention, what I claim is—

1. In an evaporating apparatus, an evaporating-pan having a cover; an air-heating furnace, in which the air is heated in a compartment separate from the combustion-chamber; an air-screen; and means for circulating heated air from said screen successively through the furnace and evaporating-pan, and thence through a heat-recovering chamber in which the vapor-laden air imparts its heat to a fresh quantity of air to be subsequently circulated through the pan, substantially as specified.

2. In an evaporating apparatus, an evaporating-pan having tubes of vitreous material submerged therein; a heat-recovering chamber; means for circulating heated air through said tubes in the evaporating-pan in contact with the solution; and thence through the heat-recovering chamber where it imparts its heat to a fresh quantity of air to be subsequently used in the evaporating-pan, substantially as specified.

3. In an evaporating apparatus, an evaporating-pan built up of tubular tiles laid in cement to form cellular non-conducting bottom and side walls, substantially as specified.

4. In an evaporating apparatus, an evaporating-pan built up of cement, and having air-cells formed in the bottom and side walls to produce a non-corrosive and non-conducting pan, substantially as specified.

5. In an evaporating apparatus, an evaporating-pan; a cover therefor; a tube located in a substantially horizontal position therein below the normal surface of the solution so as to be submerged therein with both ends of the tube opening into the pan; and means for circulating a heated gas first through the tube and then across the surface of the solution beneath the cover, substantially as specified.

6. In an evaporating apparatus, an evaporating-pan; a tube located in a substantially horizontal position therein below the normal surface of the solution so as to be submerged therein, and with both ends of the tube opening into the pan; and means for circulating a heated gas through said tube together with the solution, substantially as specified.

7. In an evaporating apparatus, an evaporating-pan built up of cement-work to form a non-corrosive and non-conducting pan; tubes of vitreous material open at the ends and located below the normal surface of the solution; and means for circulating heated air through said tubes in contact with the solution, substantially as specified.

8. In an evaporating apparatus, an evaporating-pan composed of cement-work to form a non-corrosive and non-conducting pan; a preliminary heating compartment formed therewith, and provided with tubes of vitreous material bedded in the cement-work and connecting-flues formed in the walls of the compartment, substantially as specified.

9. In an evaporating apparatus, an evaporating-pan built up of tubular tiles laid in cement to form cellular non-conducting bottom and side walls; and tubes tapping the wall-cells from the exterior and adapted to drain any leakage therefrom, substantially as specified.

10. In an evaporating apparatus, an evaporating-pan having a cover; baffle-plates extending down from the under side of the cover to form an extended air-conduit in contact with the substance to be evaporated, an air-heating furnace; and means for circulating heated air therefrom through said air-conduit, and thence through a heat-recovering chamber in which the vapor-laden air is caused to impart its heat to a fresh quantity of air to be subsequently circulated through the air-circuit in the pan, substantially as specified.

11. In a crystallizing apparatus, an air-heating furnace; an evaporating-pan having an air-conduit in contact with the solution in the pan; a blower and pipes for circulating air first through the furnace to heat it, and then through the pan in contact with the substance to be evaporated; and means substantially as specified for transferring the heat from the air after it has passed the evaporating-pan into a fresh quantity of air to be subsequently used in the pan, substantially as specified.

12. In a crystallizing apparatus, a combustion-chamber; an offtake-flue therefrom; a jacket surrounding said chamber and flue; an evaporating-pan having an air-conduit in contact with the solution in said pan; a heat-recovering chamber in which the heat from the gases escaping from the pan is transferred and absorbed into a fresh quantity of air to be subsequently used in the pan; and means for circulating air through said jacket, and through the recovering-chamber to the evaporating-pan, substantially as specified.

13. In a crystallizing apparatus, a combustion-chamber; an offtake-flue therefrom; a jacket surrounding the combustion-chamber and its flue-pipes; an evaporating-pan having an air-conduit in contact with the solution in said pan; a heat-recovering chamber, in which the heat of the gases escaping from the pan is transferred and absorbed into a fresh quantity of air to be subsequently used in the pan; a screening-chamber; and means for circulating air from said screening-chamber through the combustion-chamber jacket, the flue-jacket, and the heat-recovering chamber to the evaporating-pan, and from the evaporating-pan through the heat-recovering chamber, substantially as specified.

14. In a crystallizing apparatus, a combustion-chamber; an offtake-flue therefrom; a jacket surrounding said chamber and flue; an evaporating-pan having an air-conduit in contact with the solution in said pan; a heat-recovering chamber in which the heat from the gases escaping from the pan is transferred and absorbed into a fresh quantity of air to be subsequently used in the pan; a preliminary heater through which the solution is passed to the pan; and means for circulating air through said combustion-chamber and flue-jacket, through the heat-recovering chamber to the evaporating-pan, and from the evaporating-pan back through the heat-recovering chamber and then through the preliminary heater, substantially as specified.

15. In an evaporating apparatus, a pan built of cement, having tubular cells formed in the bottom and side walls; and normally-closed passages leading from the exterior of the pan to said cells, for the purpose of draining the cells and localizing leaks in the pan, substantially as specified.

16. In an evaporating apparatus, an evaporating-pan; a tube open at both ends, supported in a substantially horizontal position in the pan; and means for circulating a heated gas through said tube in contact with the solution, substantially as specified.

17. In an evaporating apparatus, an evaporating-pan built up of cement-work to form a non-corrosive and non-conducting pan; tubes open at both ends, supported in a substantially horizontal position in the pan; and means for circulating heated air through said tubes in contact with the solution.

18. In an evaporating apparatus, an evaporating-pan having tubes of vitreous material supported therein in a substantially horizontal position; a heat-recovering chamber; means for circulating heated air through said tubes in the evaporating-pan in conjunction with the solution, and thence through a heat-recovering chamber where it imparts its heat to a fresh quantity of air to be subsequently used in the evaporating-pan, substantially as specified.

In testimony whereof I have affixed my signature in presence of two witnesses.

CASPER W. MILES.

Witnesses:
W. R. WOOD,
OLIVER B. KAISER.